UNITED STATES PATENT OFFICE.

WM. L. POTTER, OF CLIFTON PARK, NEW YORK.

IMPROVED ROOFING-CEMENT.

Specification forming part of Letters Patent No. 56,444, dated July 17, 1866.

*To all whom it may concern:*

Be it known that I, WILLIAM L. POTTER, of Clifton Park, in the county of Saratoga and State of New York, have invented a new and useful Improvement in Composition Roofing; and I do hereby declare that the following is a full, clear, and exact description thereof, which will enable others skilled in the art to make and use the same.

My invention has for its object to furnish an improved composition for roofing and other similar purposes simple and cheap in its preparation, and which will not be softened and made to run, but will be hardened, by the heat of the sun; and it consists of a composition formed of the ingredients and prepared in the manner hereinafter more fully described.

In preparing this composition I take clay thoroughly dried and powdered in any desired quantity, and mix with it a sufficient quantity of raw coal-tar to moisten it, and reduce the mass when thoroughly mixed to the consistency of thin mortar, working the tar and powdered clay together in the same manner that mortar is worked in preparing it for use. This composition thus prepared is then spread in a thin coat over the roof or other surface to be protected either with a trowel or with a brush. This coating in a short time becomes hard and solid, wholly impervious to water, and the only effect produced upon it by the action of the sun is to make it harder.

This composition may be made thicker or thinner by varying the amount of coal-tar mixed with the powdered clay, according to the character and situation of the surface to be coated or covered, and the thicker the coating to be applied the stiffer the composition should be made.

I am aware that a cement has been used for similar purposes made by boiling coal-tar and powdered clay. This I do not claim; and it has been found in practice that the cement thus formed is injuriously affected by the sun, the heat of the sun causing said cement to soften and run, which renders it unsuitable for use in situations exposed to the action of the sun, whereas the effect of the sun upon my composition is to harden it and make it more firm and solid.

Having thus described my invention, what I claim as new, and desire to secure by Letters Patent, is—

An improved composition for roofing and similar uses, formed by mixing raw coal-tar and powdered clay with each other, substantially in the manner described, and for the purposes set forth.

WM. L. POTTER.

Witnesses:
W. O. VANDENBURGH,
G. D. CARD.